(12) United States Patent
Kazmi et al.

(10) Patent No.: US 11,922,683 B2
(45) Date of Patent: Mar. 5, 2024

(54) TYRE SIDEWALL IMAGING METHOD

(71) Applicant: WheelRight Limited, Oxfordshire (GB)

(72) Inventors: Syed Wajahat Ali Shah Kazmi, Oxfordshire (GB); Ian Thomas Nabney, Oxfordshire (GB); George Vogiatzis, Oxfordshire (GB); Alexander Paul Codd, Oxfordshire (GB)

(73) Assignee: WheelRight Limited, Oxfordshire (GB)

( * ) Notice: Subject to any disclaimer, the term of this patent is extended or adjusted under 35 U.S.C. 154(b) by 381 days.

(21) Appl. No.: 17/299,720

(22) PCT Filed: Jan. 20, 2020

(86) PCT No.: PCT/GB2020/050105
§ 371 (c)(1),
(2) Date: Jun. 3, 2021

(87) PCT Pub. No.: WO2020/152440
PCT Pub. Date: Jul. 30, 2020

(65) Prior Publication Data
US 2022/0058417 A1 Feb. 24, 2022

(30) Foreign Application Priority Data
Jan. 23, 2019 (GB) ..................................... 1900915

(51) Int. Cl.
*G06K 9/00* (2022.01)
*G06F 18/213* (2023.01)
(Continued)

(52) U.S. Cl.
CPC ............ *G06V 10/82* (2022.01); *G06F 18/213* (2023.01); *G06F 18/214* (2023.01); *G06F 18/24* (2023.01);
(Continued)

(58) Field of Classification Search
None
See application file for complete search history.

(56) References Cited

U.S. PATENT DOCUMENTS

2016/0162761 A1 6/2016 Bulan et al.
2016/0171328 A1 6/2016 Bulan et al.
(Continued)

FOREIGN PATENT DOCUMENTS

CN 108287914 A 7/2018
CN 109255344 A 1/2019
(Continued)

OTHER PUBLICATIONS

Combined Search and Examination Report for Application No. GB1900915.8 dated Jul. 19, 2019, 7 pages.
(Continued)

*Primary Examiner* — Soo Jin Park

(57) ABSTRACT

A computer implemented method for generating a region of interest on a digital image of a sidewall of a tyre, the sidewall having one or more embossed and/or engraved markings, is provided. The method comprises generating a histogram of oriented gradients feature map of the digital image, inputting the histogram of oriented gradients feature map into a trained convolutional neural network, wherein said trained convolutional neural network is configured to output a first probability based on the input histogram of oriented gradients feature map that a region of pixels of the digital image contains the embossed and/or engraved markings, and if the first probability is at or above a first predetermined threshold, accepting said region of pixels as said region of interest.

12 Claims, 12 Drawing Sheets

(51) Int. Cl.
  *G06F 18/214* (2023.01)
  *G06F 18/24* (2023.01)
  *G06N 3/08* (2023.01)
  *G06T 3/00* (2006.01)
  *G06V 10/82* (2022.01)
  *G06V 10/94* (2022.01)
  *G06V 20/62* (2022.01)
  *G06V 30/146* (2022.01)
  *G06V 30/18* (2022.01)
  *G06V 30/10* (2022.01)

(52) U.S. Cl.
  CPC ............. *G06N 3/08* (2013.01); *G06T 3/0093* (2013.01); *G06V 10/95* (2022.01); *G06V 20/63* (2022.01); *G06V 30/147* (2022.01); *G06V 30/18057* (2022.01); *G06V 30/18095* (2022.01); *G06V 30/10* (2022.01)

(56) References Cited

U.S. PATENT DOCUMENTS

| | | | |
|---|---|---|---|
| 2017/0262999 A1* | 9/2017 | Kimura | G06T 7/73 |
| 2018/0089497 A1* | 3/2018 | Romanenko | G06V 10/255 |
| 2018/0150689 A1* | 5/2018 | Kimura | G06V 30/1906 |
| 2018/0181826 A1 | 6/2018 | Goncalves et al. | |
| 2018/0268532 A1 | 9/2018 | Wang et al. | |
| 2018/0299352 A1 | 10/2018 | Rose et al. | |

FOREIGN PATENT DOCUMENTS

| | | |
|---|---|---|
| JP | 2018173818 A | 11/2018 |
| WO | 2017/060739 A1 | 4/2017 |
| WO | 2019/084385 A1 | 5/2019 |

OTHER PUBLICATIONS

International Search Report and Written Opinion for PCT Application No. PCT/GB2020/050105, dated Apr. 17, 2020, 12 pages.

International Preliminary Report on Patentability for PCT Application No. PCT/GB2020/050105, dated Jan. 22, 2021, 11 pages.

Bhamare, H. et al., "Quality Inspection of Tire Using Deep Learning based Computer Vision", International Journal of Engineering Research & Technology, Nov. 2019, ISSN 2278-0181, vol. 8, Issue 11, p. 701-704.

Kazmi, W. et al., "An Efficient Industrial System for Vehicle Tyre (Tire) Detection and Text Recognition Using Deep Learning", IEEE Transactions on Intelligent Transportation Systems, 15th International Conference on Automation Science and Engineering, Aug. 2019, pp. 1074-1079.

Wahdan, T. et al., "Tire Type Recognition Through Treads Pattern Recognition and Dot Code OCR", Ubiquitous Computing and Communication Journal, Feb. 2015, ISSN 1992-8424, vol. 9, Issue 3, pp. 1481-1488.

* cited by examiner

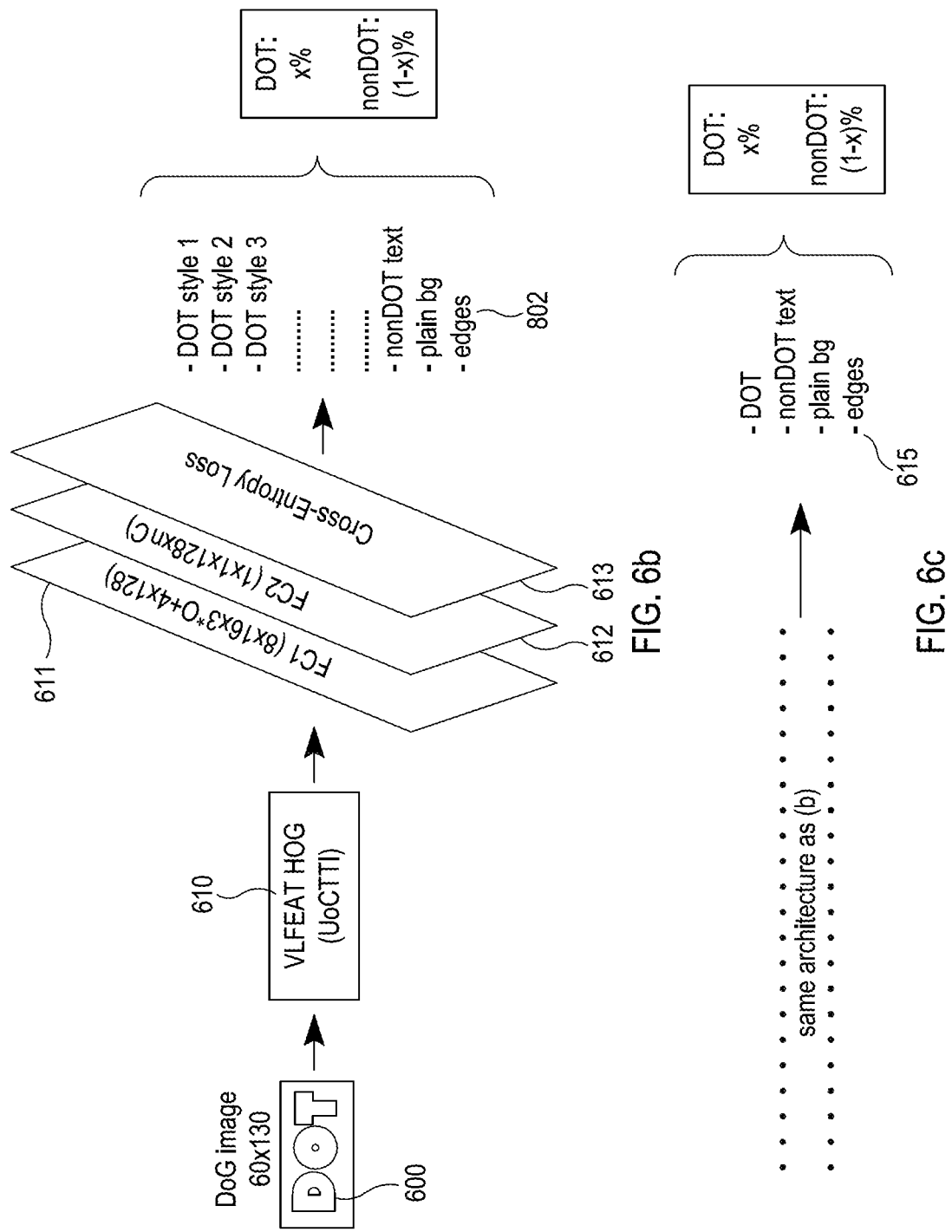

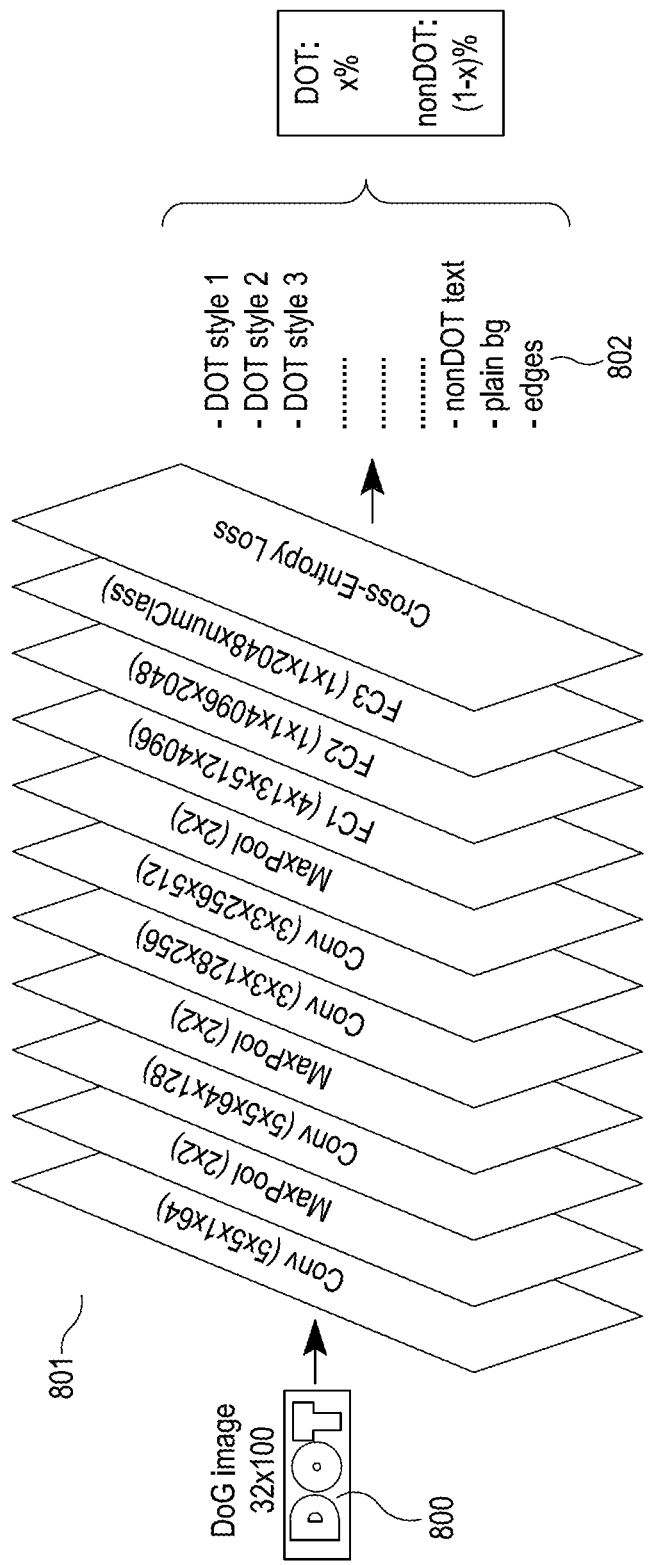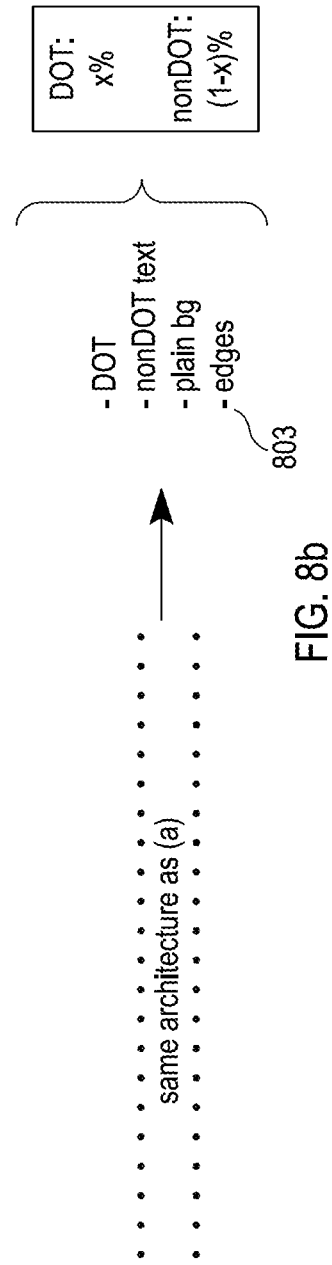
FIG. 8a
FIG. 8b

TYRE SIDEWALL IMAGING METHOD

This application is a national phase application of International Patent Application No. PCT/GB2020/050105, filed on Jan. 20, 2020, which is based on and claims the priority to and benefits of British Patent Application No. 1900915.8 filed on Jan. 23, 2019. The content of all of the above applications is incorporated herein by reference in their entirety.

TECHNICAL FIELD

The present invention relates to a method of reading embossed and/or engraved markings on a sidewall of a tyre, and more particularly to a computer implemented method for generating a region of interest.

BACKGROUND

The outward face of vehicle tyres, known as the tyre sidewall, carries a text-based code. The code carries information about, for example, the tyre brand, manufacturing plant, age, tyre type, intended load, speed rating and size, manufacturing batch information, manufacturer details, and other product information. The code may comprise, for example, a mix of one or more letters, numbers, logos, symbols, pictograms, and/or any other visual representation of information. For vehicle users, especially fleet operators, this information is critical since it provides a consistent and reliable way to track tyre usage and condition across a fleet of vehicles, thereby greatly enhancing the ability of the fleet operator to carry out data analytics on the fleet's stock of tyres and detect when tyres develop a fault and/or are beginning to fail.

There have been attempts to automate the process of reading a tyre sidewall, however such systems are either 3D scanner based systems for use in indoor and controlled inspection tasks (available from MicroEpsilon, Cognex, and Numetrix) or handheld laser devices for both indoor and outdoor applications. Such systems are either expensive to manufacture given the structured laser light components, challenging to calibrate, prone to breaking and/or still require human operator assistance so cannot be said to be truly automated and cost effective.

Applying optical character recognition (OCR) on images taken without structured light would significantly reduce hardware costs. However, because outdoor use of tyres leads to wearing of the sidewall text (for example due to material erosion, dust, dryness and/or humidity), and because the text has a very low contrast (black-on-black) which is at times challenging even for human observers to decipher, let alone for an automated system, previous attempts based on colour or grayscale image OCR have not been successful.

A challenge in producing such a system is that it is desirably fast enough to read the text both on a moving vehicle tyre as it drives past the system or on a stationary tyre as the field of view of the system is moved over the tyre. It is also desirably able to compensate for variable conditions (e.g. different weather conditions outdoors and/or dusty/dirty conditions indoors at a fleet depot), and produce accurate and reproducible results without assistance from a human operator.

An imaging system which provides enhanced contrast images is proposed in WO2017060739 A1. In particular, for reading embossed or engraved text such as a tyre sidewall code, lighting is important because the contrast and thus legibility of the text can be improved through shadow casting. Whilst WO2017060739 A1 proposes using image analysis software to perform OCR on such images to read embossed markings, conventional OCR techniques as described in WO2017060739 A1 do not perform well because they are too slow and/or have low accuracy in non-ideal, non-laboratory settings.

Recent developments in deep learning based image classification and text recognition have pushed deep convolutional neural networks (CNNs) to the top of performance tables for text recognition of benchmark data sets such that almost all the top-ranked results in image processing now use deep learning instead of hand-crafted features. However, the deep convolutional neural networks which rank highly in performance tables are tuned to work well on benchmark data sets which do not include tyre image data. Indeed, it does not follow that such networks will be successful when they are used on data such as tyre images obtained from cameras in the field. Such deep networks have been used to detect and read text in the wild (i.e. in high noise environments) but in these cases the data used has exhibited a reasonable degree of both contrast and colour difference between the text being read and the background of the image. Therefore, an improved system and method of recognising text on the sidewall of a tyre is required.

STATEMENT OF INVENTION

In general terms, the invention relates to a method of more accurately and efficiently identifying regions of interest on images which have a low contrast and low colour difference, such as images of tyre sidewalls. The method combines Histogram of Oriented Gradients (HOG) technique with convolutional neural network layers to improve efficiency and accuracy compared to known techniques, despite the low contrast and colour difference.

By identifying regions of interest on low contrast, low colour difference images more accurately and efficiently, faults such as tears near the tyre's embossed and/or engraved markings that otherwise would have been missed may be more easily identified, associated with a specific tyre, and tracked, thereby providing the effect of improving tyre safety. Additionally, a central database of tyre identification information and associated tyre fault and/or safety information can be updated. It can then be used to determine when a tyre needs to be repaired or replaced.

More particularly, the invention relates to a method of generating a region of interest associated with a user specified character sequence on a tyre sidewall wherein a HOG of the input image is generated to obtain a map of HOG features which is used as an input to a convolutional neural network which classifies from the HOG features to determine if the user specified character sequence is present or not. In one embodiment, the HOG features can be generated externally and separately to the convolutional neural network using, for example, one of the two methods provided by the VLFeat open source library (DalalTriggs and UoCTTI). In another embodiment, they can be generated using a CNN-implemented approximation of HOG such as that described in Mahendran and Vedaldi (2015), *Understanding Deep Image Representations by Inverting Them, IEEE Conference on Computer Vision and Pattern Recognition, IEEE Compt. Soc*. This paper indicates that HOG feature generation using a CNN is numerically indistinguishable from the HOG feature generation approach provided by the VLFeat open source library except that it also permits the calculation of HOG feature derivatives which advantageously reduces the complexity of any subsequent processing operations. The term HOG features and HOG are used herein to mean those generated using the approach such as that provided by the VLFeat open source library and/or the CNN approach such as that set out in Mahendran and Vedaldi (2015) and the other papers referred to therein.

Additionally, the following terms as used herein are given the following definitions:

"synthetically generated/synthetic data"—data generated using an algorithm and used to increase the total volume of data available for training, for example where only limited data from other sources is available;

"tyre detection"—identifying which pixels in an image of a tyre correspond to the tyre and which pixels correspond to background such as a hubcap or bodywork of the vehicle;

"unwarping"—mapping an image of a curved tyre sidewall to an image where the curve has been removed or straightened;

"stack of convolutional filters"—a cascade of image processing operations including convolutional filters, together forming a or part of a convolutional neural network;

"fully connected convolutional layers"—a convolutional filter whose mask size in height, width and the number of channels is the same as the size of the feature map at the previous layer. It produces the same output size of the feature map as a fully connected layer would do.

BRIEF DESCRIPTION OF THE DRAWINGS

FIG. 6(b) is a block diagram of CNN architecture according to an embodiment.

FIG. 6(c) is a block diagram of CNN architecture according to an embodiment.

FIG. 8(a) is a block diagram of network architecture according to an embodiment.

FIG. 8(b) is a block diagram of network architecture according to an embodiment.

DETAILED DESCRIPTION

Figure 1:
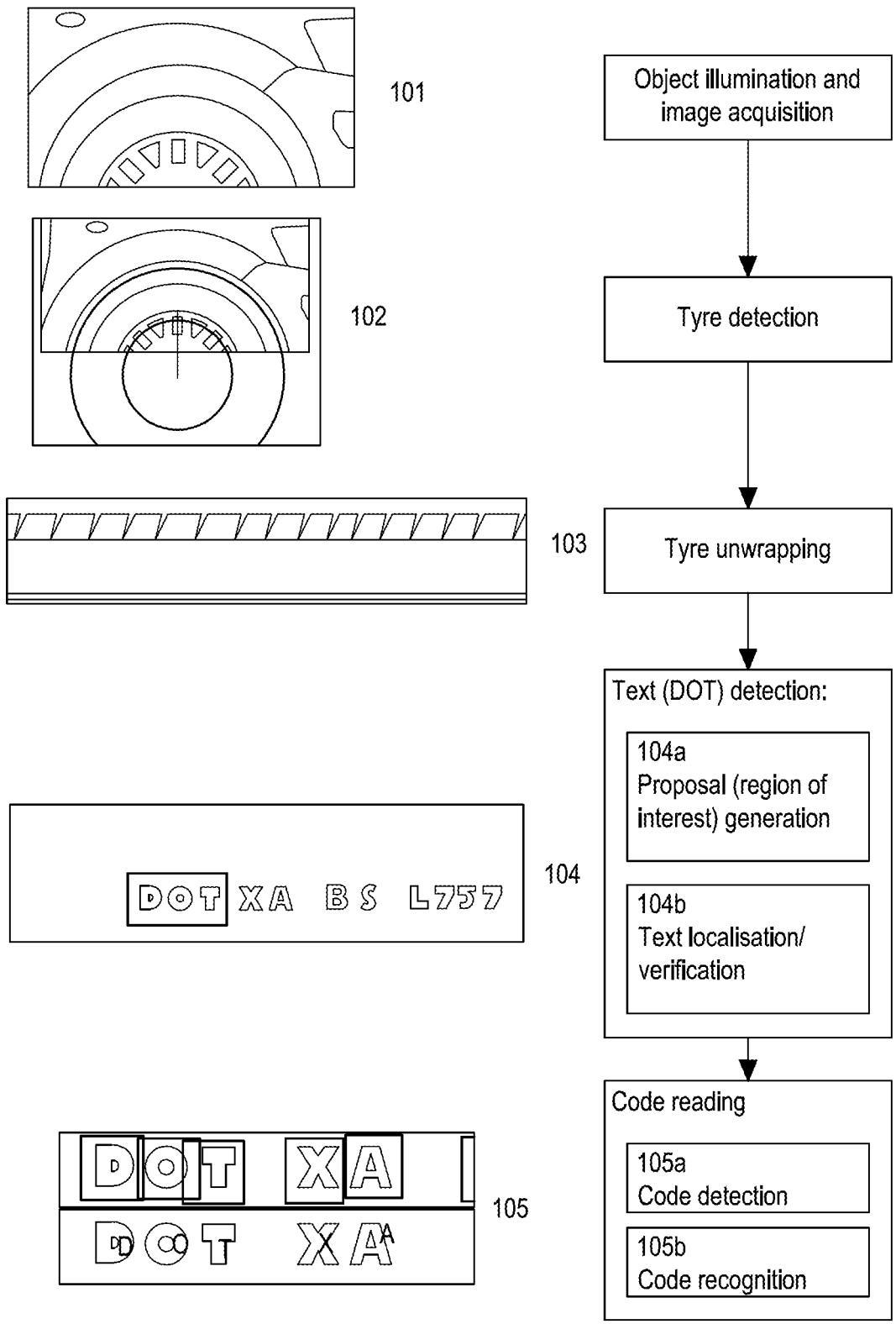
FIG. 1 illustrates a five stage method according to an embodiment.

A five stage method which is an embodiment of the invention is proposed as shown in FIG. 1 comprising object illumination and high framerate image acquisition 101, tyre detection 102, tyre unwarping 103, text detection 104 (wherein text on the tyre sidewall is localised by finding a user specified character sequence, such as "D", "0", "T"), and code reading 105 (wherein the tyre sidewall code containing product information concerning the tyre is detected and recognised).

The stages may be used together as a single system or used individually and/or combined with systems not described herein, such as with the imaging system described in WO2017060739 A1, or with a moving imaging system which uses a camera and flash of a smartphone, tablet, or other similar device. In other instances, where daylight provides enough illumination, a flash may be omitted entirely.

In particular, in the text detection 104 stage, a proposal (i.e. region of interest) generator method 104a is provided which identifies regions of interest which may contain the user specified character sequence. As will be described in more detail below, in a first step, the proposal generator method 104a generates from an input image of a sidewall of a tyre, a map of Histogram of Oriented Gradients (HOG) features, each feature being a HOG, using either a method such as that provided by the VLFEAT open source library or using a CNN. In a second step, the HOG features are input into a CNN classifier architecture. By first generating the HOG features and using this as an input to the CNN classifier architecture, the proposal generator was found to outperform methods based solely on hand-crafted features with a separate classifier in accuracy or based solely on a deep CNN in efficiency.

Further, by having HOG features generated a priori and input into the CNN architecture, the learning task is reduced to classifying HOG inputs into one or more classes to generate a region of interest, rather than to classifying low-contrast black-on-black images whose features i.e. pixel values are challenging to determine and learn patterns in them. This means the system as a whole is far more able to generalize to unseen data sets such as those found in the wild. By way of contrast, if a pure CNN architecture (without a HOG input) is given low-contrast black-on-black images, the architecture is made more complex (e.g. more layers and/or more complex connections between layers) in order for the CNN to be able to learn the image features. Increased complexity results in increased computational resource overhead, increased memory resource overhead and reduced efficiency. Thus, whilst pure, deep CNN architectures may still outperform the presently proposed combined HOG and CNN architectures as measured purely by accuracy, they fail in terms of efficiency for real time applications and low memory systems when applied to the real world problem of tyre sidewalls. Further, in terms of resource usage, using a deep CNN for the purposes of proposal generation greatly increases the resource overhead of the system so is not an efficient use of resources in a low resource system particularly when the proposed HOG-CNN architecture described herein can generate equally relevant proposals with an order of magnitude improvement in computational efficiency and reduction in memory footprint thereby overcoming the requirement for expensive GPUs, memory and other hardware required for deep CNN architectures.

It is envisaged that the proposal generator method 104a described herein may thus improve the performance of any system which generates regions of interest on a tyre sidewall based on embossed and/or engraved markings. The inventors envisage its use as a standalone invention and/or for use with any known OCR techniques.

The details of the other stages: object illumination and high framerate image acquisition 101, tyre detection 102, tyre unwarping 103, the verification 104b of the regions of interest proposed by the proposal generator, and text reading 105 are not essential to enabling the advantages provided by the proposal generator method 104a. The details of these stages will be described below before an exemplary implementation of the proposal generator method is explained in more detail.

Image Acquisition 101

As described above, an imaging system such as that proposed by WO2017060739 A1 may be used to obtain a digital image of the sidewall of a tyre on which embossed and/or engraved text or markings are present. This system captures only a portion of a tyre sidewall in any given image so a series of images is normally taken as the tyre rolls past to ensure the entire circumference of the tyre sidewall is captured and thus that any portion of sidewall having the embossed and/or engraved markings is captured too.

Tyre Detection 102 and Unwarping 103

Figure 2:
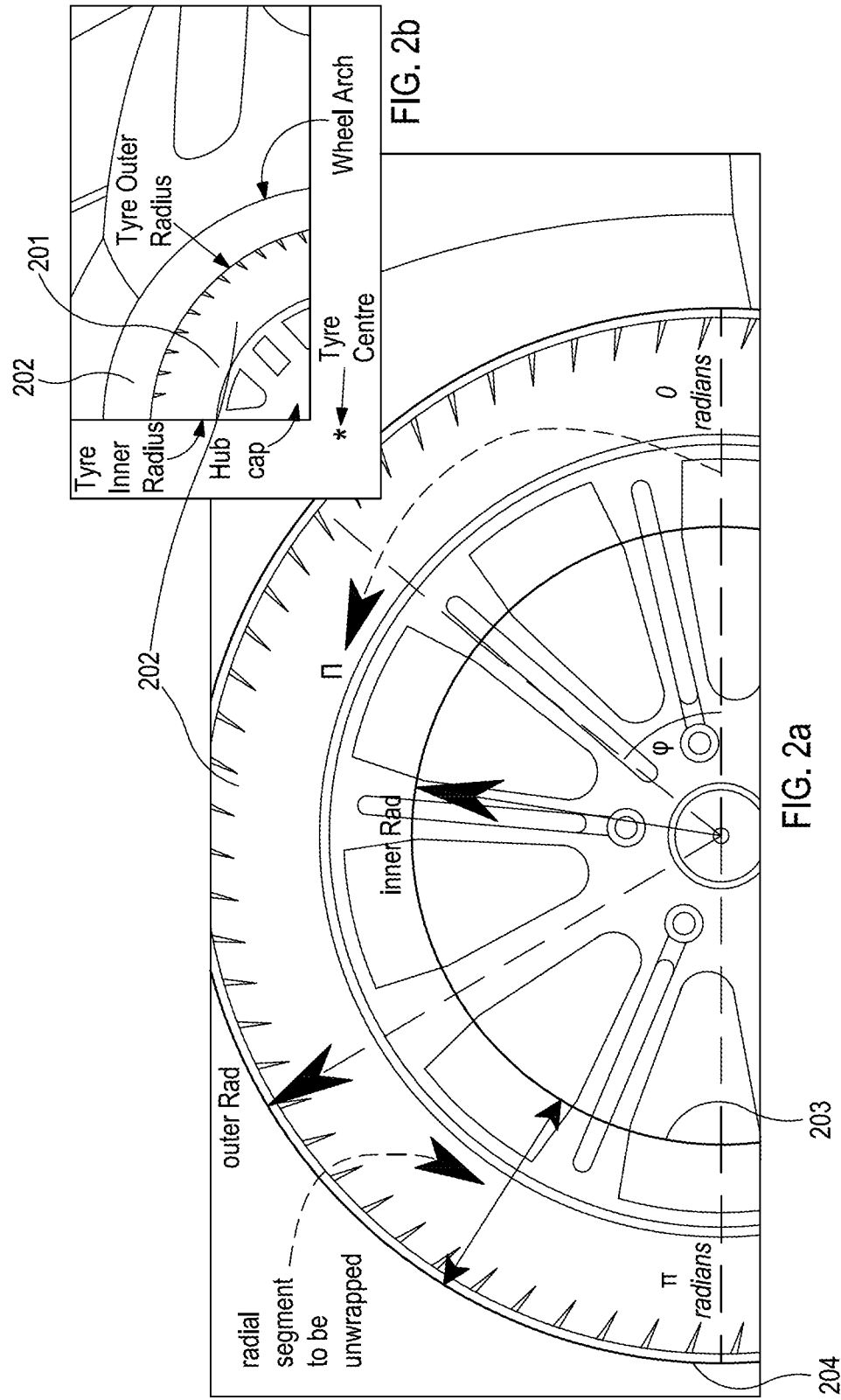
FIG. 2(a) shows an unwarping scheme on which a tyre's inner radius is indicated.
FIG. 2(b) shows an unwarping scheme on which a tyre's outer radius is indicated.

Once the image or images are acquired, the circular segment of the tyre may be detected (i.e. its inner and outer radii are localised) using a Circular Hough Transform (CHT) or other suitable techniques. Before performing the CHT, the image may be pre-processed using a Difference of Gaussian (DoG) filter which not only normalizes the illumination, but also enhances the edges. As a part of the pre-processing, the images may optionally be down sampled to between $\frac{1}{4}^{th}$-$\frac{1}{8}^{th}$ of the original size which improves both the efficiency and accuracy of tyre detection. The down sampled images are then padded with black pixels since the centre of the tyre may lie outside the image frame captured by the camera (i.e. black pixels are added to provide a suitably sized coordinate system in which CHT can identify a tyre centre). Once pre-processing has occurred, CHT is then used to detect the circular junction of the hub cap and so it detects the tyre's inner radius 204 with some safe offset and the outer radius 203 as illustrated in FIG. 2(a) which correspond to the real inner radius 201 and outer radius 202 of the tyre as shown in FIG. 2(b). However, sometimes a wrong circle is detected due to the presence of another dominant circularity in the image (such as a wheel arch or circularity of a hubcap as indicated in FIG. 2(b)) which may be, at times, more dominant as a result of greater contrast. In order to avoid this situation, all of the captured images associated with a particular tyre (axle) are processed for n radii ranges (in parallel threads). The detected circles are then used to generate a radius range histogram. The radius corresponding to the radius range bin with the highest number of detected circles in it is selected as the best detected inner tyre radius 201. This approach is simple (i.e. resource efficient) and is able to remove any outliers effectively and successfully due to the consensus that arises from the moving tyre where the tyre circularity dominates as a result of the field of view of a given image.

Once the junction of the hub cap and tyre (i.e. the inner tyre radius 201) is detected, a second circle corresponding to the outer radius 202 of the tyre 200 is chosen at a fixed offset from the first radius. This is sufficient to cover the area in which tyre sidewall text (e.g. the text of a DOT code) is expected to appear since the tyre sidewall text generally falls near the inner radius or in the middle rather than close to the tread near the outer radius 202 of the tyre 200. Owing to its proximity to the inner radius, the detected inner radius is also reduced by a fixed number of pixels as shown in FIG. 2(a) to ensure that the borderline cases are handled properly.

After tyre detection, the radial image patch between the inner 201 and the outer 202 radii is unwarped to a rectangular lattice using a Polar-to-Cartesian mapping. This not only unwarps the circularity, but also crops out only the necessary part of the image, which improves the efficiency of the next stages.

The first three stages of the pipeline, namely, object illumination and image acquisition 101, tyre detection 102 and unwarping 103 may be implemented in any suitable computer language either by implementing all the algorithms from scratch, or preferably using OpenCV. But other computer vision libraries and vision processing techniques may also be used.

Text Detection: DOT Detection 104

In the text detection 104 stage, a machine-learning based approach for text detection and localisation is employed. Unwarped images from the tyre unwarping stage 103 are used. Due to industry regulations, most commercial tyre sidewall codes are preceded by the character sequence "D", "O", and "T" which stands for the Department Of Transport, USA. In the present example, the DOT character sequence is used as an anchor to localise the text related to the tyre sidewall code. However, it is envisaged that other character sequences, letters, numbers, logos, symbols, pictograms, and/or any other visual representation of information may also be used as an anchor with which the text of the tyre sidewall code can be localised. For example, if a fleet operator only uses one brand of tyre, an associated brand logo or trade mark may be used to localise the text on the tyre sidewall.

The purpose of the anchor is to narrow down the search space, as in most cases it precedes the text of the rest of the tyre sidewall code. The text detection 104 stage has two cascades i.e. sets of subsequent image processing operations: proposal (i.e. region of interest) generation 104a followed by verification or text localisation 104b. As described above, it is envisaged that the proposal generator method 104a as described herein may be used as a standalone method with its output separately processed (e.g. using equipment owned by a third party) using known image processing techniques which rely on proposal (i.e. region of interest) generation to detect and/or recognise text on tyre sidewalls.

Proposal Generation 104a

As the text is of very low contrast, for proposal generation, low-level feature-based approaches (such as edge boxes proposed by "Zitnick and Dollar, *Edge Boxes: Locating object Proposals from Edges, ECCV, European Conference on Computer Vision,* 2014") were found by the inventors to be unsuitable because the strong edges from other segments of the tyre dominate (most of which do not contain text), resulting in large numbers of proposals which do not contain any text. Determining which of these proposals does or does not contain text significantly increases the resource overhead.

Further, whilst hand-crafted features have been successfully used for text detection (such as described in e.g. "Wang et al, *End-to-end Scene Text Recognition, Proceedings of the 2011 International Conference on Computer Vision, IEEE Computer Society,* Washington, ICCV'11 pp 1457-1464 DOI 10.1109/ICCV.2011.6126402","Mishra et al, *Top-down and bottom-up cues for scene text recognition,* 2012 *IEEE Conference on Computer Vision and Pattern Recognition,* pp 2687-2694, DOI 10.1109/CVPR.2012.6247990, and "Mishra et al, *Image Retrieval Using Textual Cues,* 2013

*IEEE International Conference on Computer Vision and Pattern Recognition*, pp 3040-3047) such techniques are too slow for the industrial application of recognising tyre sidewall text in the wild in a reasonable time.

In particular, when the inventors tried using HOG combined with a Support Vector Machine (SVM) classifier in a sliding window manner, it produced reasonably accurate results for text detection (i.e. detecting the character sequence "D", "0", "T"), but the size of the image (500× 2000 to 4000 pixels) still means it takes a few minutes to scan each image whereby every tyre has several images associated with it. This time-scale is too long and is unacceptable for industrial applications where a vehicle fleet operator cannot reasonably be expected to wait for a scan time that long for each tyre if the system is to be superior to a system where a human operator reads and records tyre sidewall codes manually. Ideally, a practical system requires end-to-end results in less than a minute. Further, such a system should be able to run with CPU-based processing only (because the costs of GPUs can be prohibitively expensive for this application). Lower resolution images such as through lower resolution cameras or down-sampling the higher resolution images are not suitable for such small and low contrast text recognition.

Deep-CNN based branched architectures such as Faster-RCNN (as described for example in "Ren et al, *Faster R-CNN. Towards Real-Time Object Detection with Region Proposal Networks, Advances in Neural Information Processing Systems* 28, Curran Associates, Inc., pp 91-99, 2015") which use a Region Proposal Network to scan an image and produce proposals for the localisation branch are an alternative approach. Faster-RCNN have been shown to be accurate whilst maintaining efficiency on GPUs. But using deep network backbones such as those typically required by Faster-RCNN (such as VGG16 or ResNet50) for feature map and proposal generation on the sizes of images used in tyre sidewall imaging would be too costly on a CPU, so would require a large-memory GPU (11 GB or more), which increases the total system cost to the point where it would be more cost effective for a vehicle fleet operator to employ a human operator to read and record tyre sidewall codes manually. GPUs may additionally require extra cooling arrangements which can potentially limit their use in outdoor scenario in hot weather.

As described above, the present invention provides a solution to this problem by combining the generation of HOG features with a CNN-based classifier for efficiently generating proposals. In one architecture, the HOG features are generated using known methods such as those provided by the VLFeat open source library and then input into a CNN-based classifier. In another architecture, the HOG features are generated by a CNN and input into the CNN-based classifier. The first architecture is described herein HOG-MLP (multi-layered perceptron), the second as HOG-CNN.

Training Runs

All the CNN training runs discussed herein use Stochastic Gradient Descent as optimizer with back propagation in Matlab using MatConvNet library by A. Vedaldi and Lenc (2015) as described in A Vedadi and Lenc (2015) *MatConvNet-Convolutional Neural Networks for Matlab, Proceedings of the ACM, Int. Conf. on Multimedia*. However, it is envisaged that any suitable alternative training and optimisation techniques and libraries such TensorFlow, Caffe, Torch etc. may also be used. Further, in one example, the text class training data may be synthetically generated whereas the background class training data may be extracted from real tyre images. However, it is envisaged that synthetic data generation may not be required at all, for example where sufficient data from real tyre images is available. Additionally, drop out layers may be used to prevent overfitting. Further, whilst the networks described herein used one or more 50% dropout layers during the training to prevent over-fitting, it is envisaged that other techniques used to prevent over-fitting may also be used instead, such as, cross-validation, training with more data, removing features, early-stopping regularization and others. Difference-of-Gaussian (DoG) filtering was applied to the input data for illumination normalization and edge enhancement. Other techniques of contrast normalisation such as histogram equalization or adaptive histogram equalization may also be used.

Synthetic Data Generation

As described above, if not enough real image data is available, synthetic data generation may optionally be used. As an automated tyre sidewall text reader deployed in the wild will have to read sidewall text in varying conditions of light, weather and wear, a substantial amount of training data may be necessary to achieve good generalisation. Gathering a large dataset in the wild is a very costly and a time-consuming process. Instead, training data may be synthetically generated using several different fonts and a text rendering engine. Initially, a black and white text mask is created using various fonts in random sizes. The mask may then be incrementally smeared (adding multiple copies or shifting the rendering position in a small neighbourhood (de, dy pixels)). This takes place in varying directions (to represent the revolving shadows) and lengths (to represent different shadow lengths). The image mask is then fused with tyre backgrounds to produce realistic embossed/engraved text images as they should appear on the real tyre sidewall images. Given that histograms of oriented gradient features are used as input to the CNN classifier, the training data may in some embodiments comprise a plurality of histogram of oriented gradient feature maps generated from a plurality of digital images of tyre sidewalls.

Implementing the Proposal Generator Method 104*a*

Figure 3:
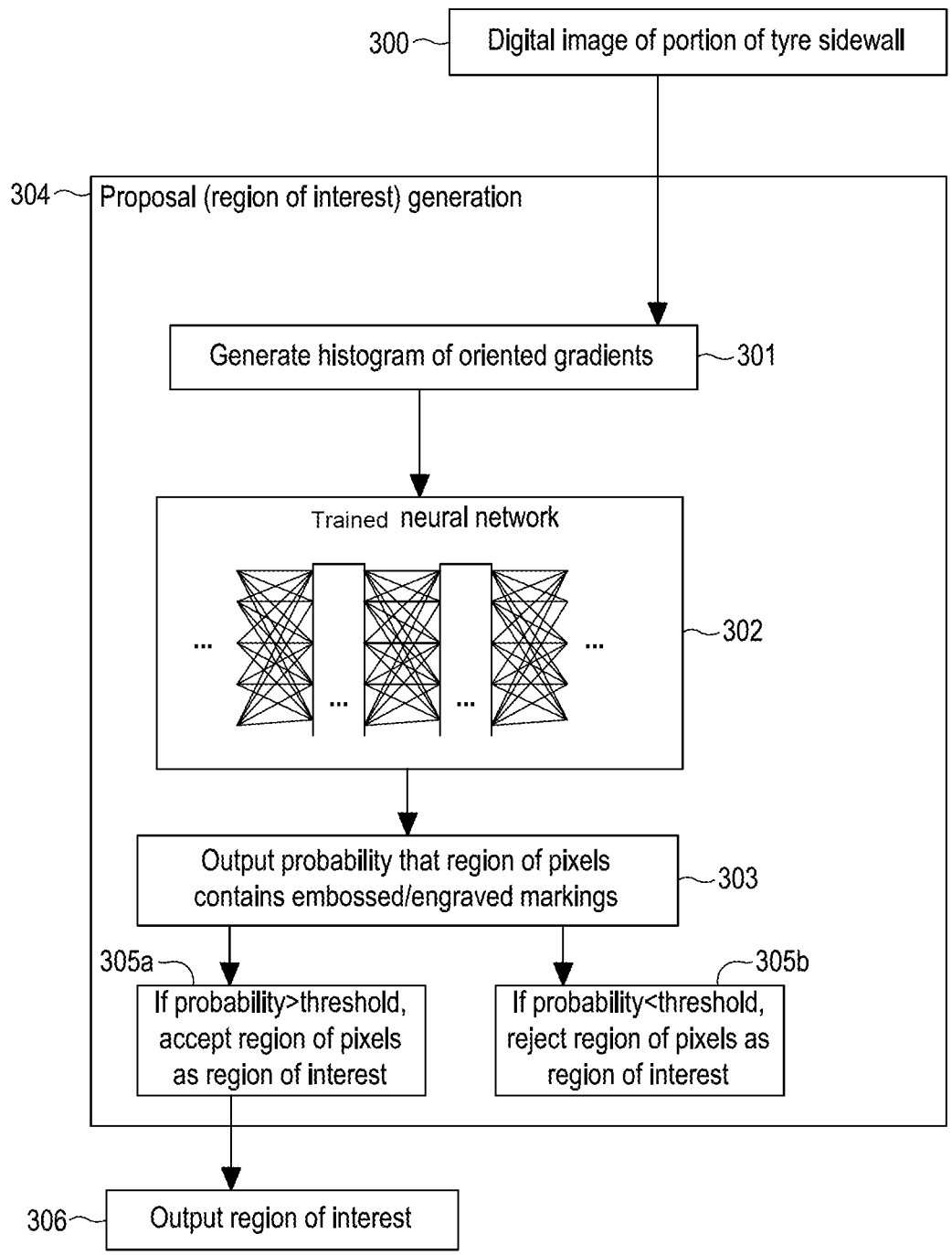
FIG. 3 is a flowchart of a proposal/region of interest generator method according to an embodiment.

FIG. 3 is a flowchart showing the steps of a proposal generator method 304 which is an embodiment of the invention corresponding to the proposal generation step 104*a* in FIG. 1. A digital image 300 of a portion of an unwarped tyre sidewall obtained for example as described above is used as an input. The tyre sidewall has one or more embossed and/or engraved markings on it such as a tyre sidewall code. A histogram of oriented gradients, and its associated feature map, of the digital image is generated 301. The generated histogram of oriented gradients is input into a trained neural network 302. The trained neural network is configured to output a first probability 303, based on the input histogram of oriented gradients and its associated feature map, that a region of pixels of the digital image contains the embossed and/or engraved markings. If the first probability is at or above a first predetermined threshold 305*a*, the region of pixels is accepted as a region of interest and outputted 306. Otherwise it is rejected 305*b*. In this way, the proposal generator method 104*a* can generate regions of interest on the digital image associated with the one or more embossed and/or engraved markings.

As described above, two alternative ways to generate HOG features are provided. In the first, HOG features are generated externally to and separately from the trained CNN classifier (for example using the methods provided by the VLFeat open source library). This is described herein as HOG-MLP. In a second, HOG features are generated by a CNN. This is described herein as HOG-CNN.

Figure 4:
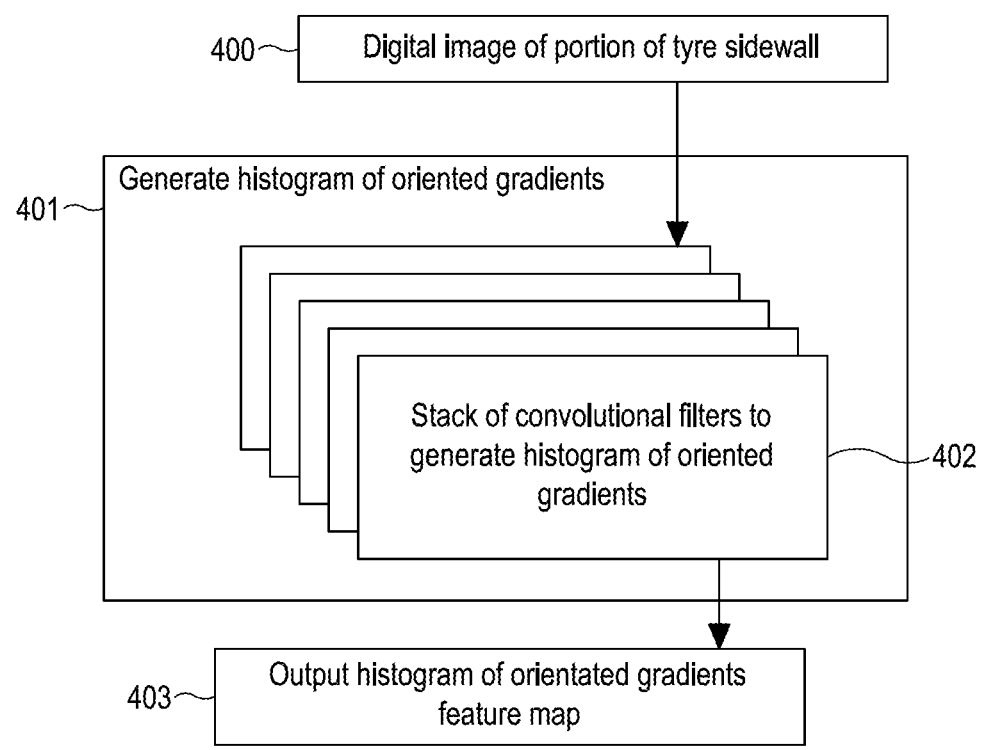
FIG. 4 is a flowchart of a method of generating a histogram of oriented gradients and corresponding feature map with a HOG-CNN architecture according to an embodiment.

FIG. 4 is a flowchart of a method of generating a histogram of oriented gradients 401 and its feature map with a CNN according to the HOG-CNN architecture described above. In particular, after receiving an input 400 of a digital image of a portion of a tyre sidewall, a stack of convolutional filters 402 is used to generate a histogram of oriented gradients and corresponding HOG feature map which is outputted 403.

Figure 5:
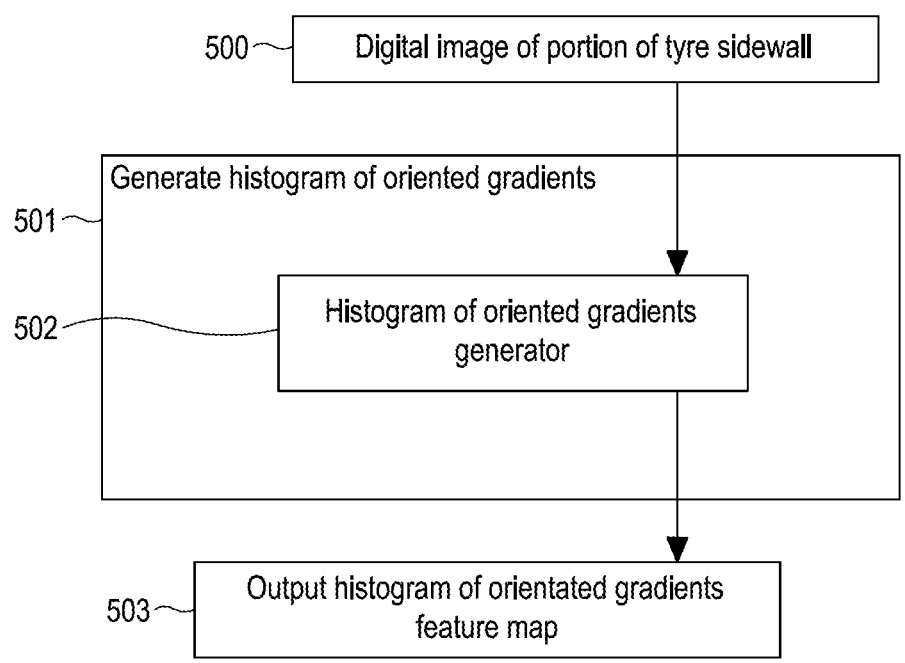
FIG. 5 is a flowchart of a method of generating a histogram of oriented gradients and corresponding feature map with a HOG-MLP architecture according to an embodiment.

FIG. 5 is a flowchart of a method of generating a histogram of oriented gradients 501 and a corresponding HOG feature map with a separate, external HOG generator 502 according to the HOG-MLP architecture described above. In particular, after receiving an input 500 of a digital image of a portion of a tyre sidewall, the HOG generator is used to generate a histogram of oriented gradients and corresponding HOG feature map which is outputted 503.

An effect provided by combining HOG features with a CNN-classifier is that the total number of generated proposals/regions of interest is significantly fewer and there are fewer false positives than for purely handcrafted techniques such as a HOG+SVM (i.e. a support Vector Machine classifier in a spatially sliding window manner). Another advantage is that overall scan/computation times are much shorter owing to the fact that the generation of HOG features is shallower and/or more efficient to compute than attempting to generate proposals/regions of interest with deep convolutional networks alone. As described above, the inventors believe that one reason for this is that HOG generation provides the image substructure (or feature map) to the CNN classifier without the CNN classifier having to learn it from the raw image data. Thereby effectively skipping the need for a deep CNN architecture. A deep architecture would need to learn the image substructure from the training data alone which is particularly difficult where the images are have a low-contrast between foreground and background as it will demand an order to magnitude more data and training time. In contrast, training a HOG-CNN can be performed with a relatively much smaller dataset and be performed very efficiently with a CPU.

HOG-CNN

FIG. 6(*a*) is a block diagram of a HOG-CNN architecture according to an embodiment. A fully connected convolutional network is plugged in at the end of a stack of convolutional filters i.e. a cascade of image processing operations ending in a HOG decomposition layer which make up the HOG feature generating layers. Together, this provides a complete CNN architecture terminating at a cross-entropy loss layer (for training) or softmax layer (for testing or applying or operating) which outputs the probability that a given input image contains embossed and/or engraved markings. Such a network is shallow with fewer convolutional layers and channels than deep networks such as those in which CNN layers are used to produce deep features. The shallow depth of the network thus provides for a significant improvement in speed, making it far more suitable for tyre sidewall text reading in the wild.

Although CNN layers for HOG as described in "Mahendran and Vedaldi (2015), *Understanding Deep Image Representations by Inverting Them, IEEE Conference on Computer Vision and Pattern Recognition, IEEE Compt. Soc*" are used, it is envisaged that any suitable CNN based HOG layer implementation may be used instead. Further, any of the HOG methods described in "Dalal and Triggs (2005), *Histograms of Oriented Gradients for Human Detection, Proceedings of the* 2005 *IEEE Computer Society Conference on Computer Vision and Pattern Recognition* (CVPR'o5)—Volume 1—pp 886-893, DOI 10.1109/CVPR.2005.177", and "Felzenszwalb et al (2010), *UoCTTI, Object Detection with Discriminatively Trained Part Based Models, IEEE Transactions on Pattern Analysis and Machine Intelligence* 32(9):1627-1645, DOI 10.1109/TPAMI.2009.167" may be used as well.

The example architecture shown in FIG. 6 has a DOT text input 601 image of 60×130 pixels pre-processed using a difference of Gaussian technique as discussed earlier. As described in "Mahendran and Vedaldi (2015), *Understanding Deep Image Representations by Inverting Them, IEEE Conference on Computer Vision and Pattern Recognition, IEEE Compt. Soc*", HOG features are extracted using a stack of convolutional filters wherein a directional filter is applied in K=2 times the number of orientations (O) where K is an index K=1, . . . k. The $K^{th}$ directional filter is given by:

$$G_k = G_x u_{1k} + G_y u_{2k} \text{ where } u_k = \begin{pmatrix} \cos\frac{2\pi k}{K} \\ \sin\frac{2\pi k}{K} \end{pmatrix} \quad (1)$$

$$G_y = G_x^T, \text{ and } G_x = \begin{bmatrix} 0 & 0 & 0 \\ -1 & 0 & 1 \\ 0 & 0 & 0 \end{bmatrix} \quad (2)$$

The directional filter casts the projection of the input along direction vector $u_k$ as $gu_k$ (where g is a constant). After directional filtering, HOG binning 602 can be performed by the following activation function:

$$h_k = \|g\| \begin{bmatrix} 1 & \text{if } gu_k > \|g\|\cos\frac{\pi}{K} \\ 0 & \text{otherwise} \end{bmatrix} \quad (3)$$

The stack of convolutional filters is shown in FIG. 6(*a*) as starting with a Conv (3×3×1×2\*O) architecture 601, however it will be appreciated that other filter architectures may also be used. (e.g. Conv (5×5×1×2\*O) or Conv (7×7×1× 2\*O)). Other examples of filters may be found in the above cited HOG implementations.

In HOG feature extraction, the binned gradients are pooled into cells which are then combined in 2×2 blocks. This is done through a stack of linear filters 603. After normalization 604 (L2 norm), the blocks are decomposed back to the cell structure and the values are clamped 605 at 0.2 (i.e. max{x, 0.2}). In the example implementation described herein, directed gradients are binned for twice the number of orientations ($h_{do}$) within the range [0,2π) along with one set of undirected gradients ($h_{uo}$). So, a total of 3×O channels are used in the HOG decomposition layer 606

Using the above example, for an input image having 60(H)×130(W) pixels, the CNN-based HOG produced a feature map of 7×16×27 for an 8×8 cell size and 9 orientations. Other cell sizes and number of orientations may also be used.

Figure 6A:
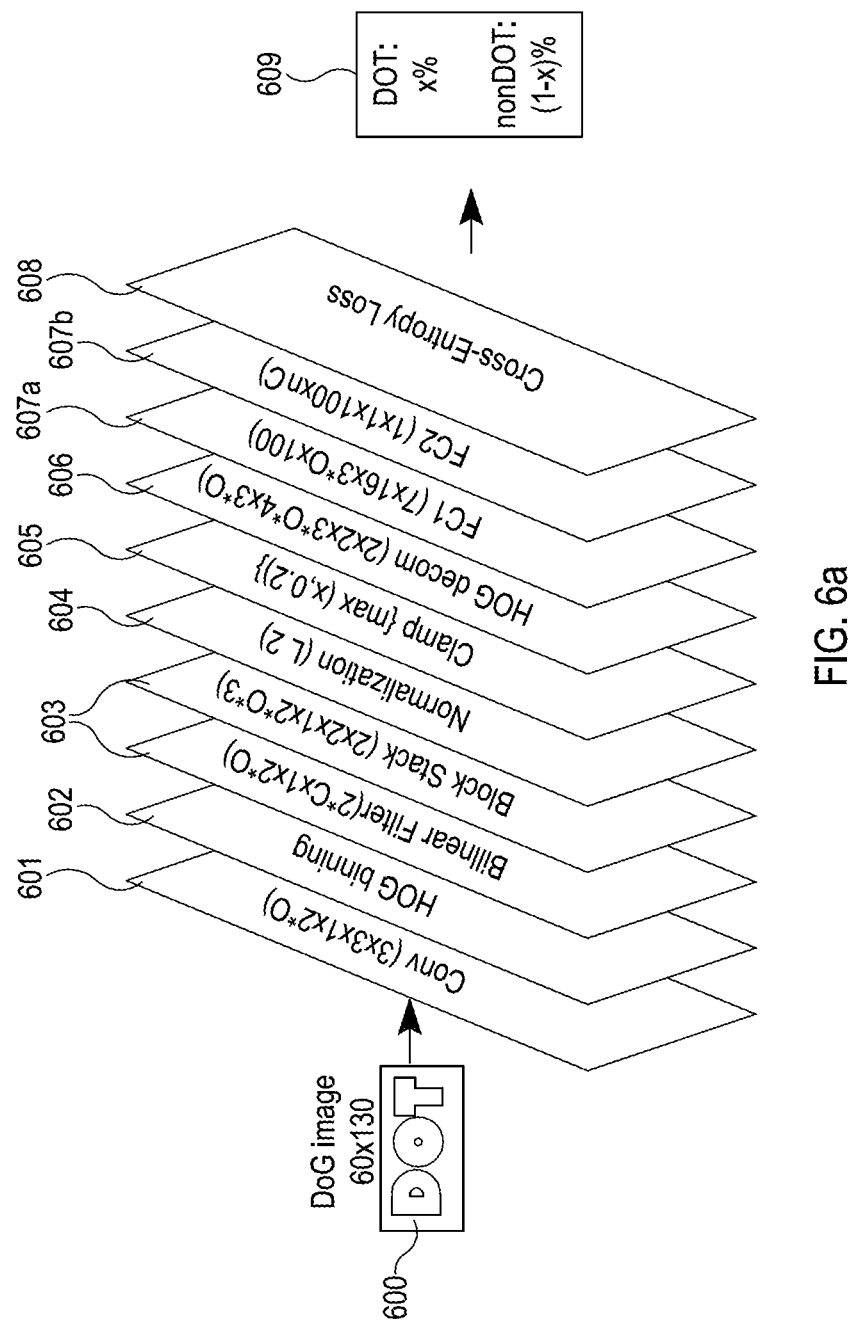
FIG. 6(a) is a block diagram of CNN architecture according to an embodiment.

This HOG output is then input into a classifier (e.g. a Multi Layered Perceptron or MLP) 607*a*, 607*b*. In the present example, the classifier 607*a*, 607*b* comprises randomly initialized fully connected (FC) layers 607*a* with a mask size of 7×16×27 CHs (CHs represents the number of channels in the current layer). This was followed by a 50% dropout and another FC layer 607b as shown in FIG. 6(a). Dropout is a regularization technique which prevents overfitting through simply skipping some neurons. It is envisaged that other techniques to prevent overfitting may also be applied, examples of which are described above, such as cross-validation, training with more data, removing features, early-stopping, regularization and others. Since both HOG feature generation and the subsequent classification is performed with FCs connected to each other as one unified CNN architecture, the term HOG-CNN is used.

A final cross-entropy loss layer 608 is also provided to train the CNN classifier through back-propagation to identify the 'DOT' text 609. In a similar manner to OverFeat (Sermanet, P., Eigen, D., Zhang, X., Mathieu, M, Fergus, R., & Lecun, Y. (2014). *Overfeat: Integrated recognition, localization and detection using convolutional networks. In International Conference on Learning Representations (ICLR*2014)), the architecture in FIG. 6(a) uses convolutional layers as FC layers and the HOG-CNN network may scan the entire image if is it bigger than the minimum required size i.e. 60×130 pixels.

Training such a network can be difficult as few layers are predefined while the final classifier is randomly initialized. In the present case, it was trained on a dataset containing less than 600K images (of size 60×130 pixels) in total with the DOT class synthetically generated. The training set contained a synthetically generated DOT class and a background class comprised of a mixture of non-DOT text, edges, textures and plain backgrounds. A total of 80-90 training epochs were deemed sufficient as a point of saturation was reached. Continuing the training further tends to over-fit the model. However, since the network is shallow and uses sparse filters, it can be efficiently trained even on a CPU (with a training time of approximately less than 5 hours).

It will be appreciated that the above example architecture is for illustrative purposes.

As explained above, the problem of high computational overhead and expense of techniques such as HOG+SVM (in a spatially sliding window manner) or of deep CNN techniques to recognise tyre sidewall text in the wild may thus be solved by using the concept of inputting the output of a HOG implementation into a shallow CNN.

HOG-MLP

For HOG-MLP, rather than using a unified CNN architecture, HOG features may be extracted from input 601 using a standalone HOG implementation 610 such as that of the VLFeat library (Vedaldi and Fulkerson 2008, *An Open and Portable Library of Computer Vision Algorithms*, ver (0.9.16), p, http://www.vlfeat.org) and then fed into a multi-class MLP (HOG-MLP) network as shown in FIG. 6(b). In the VLFEAT HOG implementation 610 used in the present example, gradients are binned for 3*O+4 texture components. Therefore, for an input 601 image size of 60(H)×130 (W), an 8×8 HOG cell size and 12 orientations (40 components in total), the first layer 611 in the network was 8×16×40 CHs. The cell size and the number of orientations were chosen through systematic search to achieve best possible detection accuracy on a cross-validation dataset. Other cell sizes and number of orientations may also be used. It was trained on an 11-class (nC=11) dataset of more than a million images containing 7 synthesized DOT classes for round/square/thin and broad fonts, clear and diffused appearance, long and short shadows, single and double spacing between the characters, and other variations, along with 4 background classes divided among plain backgrounds, non-DOT text and edges/textures. A second layer 612 was also provided, together with a cross-entropy loss layer 613. The output 614 was mapped to a binary class probability i.e. DOT/non-DOT by pre-determining which of the output classes of the cross-entropy loss layer correspond to a DOT code and which do not. This multi-class representation enables the incorporation of prior knowledge to the training and thereby increases the generalisation of the network for example so that it can cope up with the changes in the lighting configuration of the image acquisition e.g. during installation, calibration, and/or hardware product development.

If no changes to the image acquisition and/or lighting are required, the light/shadow directions in the acquired images are more consistent. In such a scenario, an alternative illustrative example of a HOG-MLP proposal generator is provided as shown in FIG. 6(c) with cell size=8×8, O=16 (making up a total of 52 components), but with only four output classes nC=4 (i.e. DOT, plain background, edge/texture, non-DOT text). The outputs 615 are again mapped to a binary classification (DOT/non-DOT). In this example, the network was trained on a dataset of just over a million images with the DOT class synthetically generated as described above. For both the illustrative HOG-MLP networks, satisfactory results were obtained after training for 30-50 epochs. Just like HOG-CNN, these sparse networks can also be trained efficiently on a CPU, something which is not possible efficiently with a deep CNN implementation.

As with HOG-CNN, it will be appreciated that the above examples of HOG-MLP architectures are for illustrative purposes. The high computational overhead and expense of for example HOG+SVM (Support Vector Machine classifier in a spatially sliding window manner) or deep CNN techniques to recognise tyre sidewall text in the wild may thus be solved by using the concept of inputting the output of a HOG implementation into a shallow CNN.

Comparison

On comparison of the two proposal generation methods, HOG-CNN vs HOG MLP, the scan times for an image of 500×3000 pixels) were around 550 and 250 ms respectively on an Intel Corei7 3.6 GHz CPU. For both HOG-CNN and HOG-MLP this is significantly faster than the minutes order of magnitude of handcrafted HOG+SVM implementations in a sliding window manner or deep CNN-based implementations.

In HOG-MLP, it is not possible to back-propagate through the feature extraction stage since the HOG part of the architecture is not a part of the CNN architecture. In contrast, in HOG-CNN, back propagation through the entire network is possible thereby increasing the ability of the HOG-CNN implementation to adapt to variations in data.

The inventors have observed that the accuracies of both the HOG-CNN and HOG-MLP architectures using the same cell sizes and number of orientations are comparable, though HOG-CNN generates fewer proposals and hence generalizes better (for example, due to back propagation) than HOG-MLP.

Text Localisation: DOT Localisation 104b

To finally localise and verify the tyre sidewall text (i.e. the tyre sidewall DOT code) from the filtered proposals, a classifier may be applied to the generated region(s) of interest to accept or reject one or more of them as a false positive.

Figure 7:
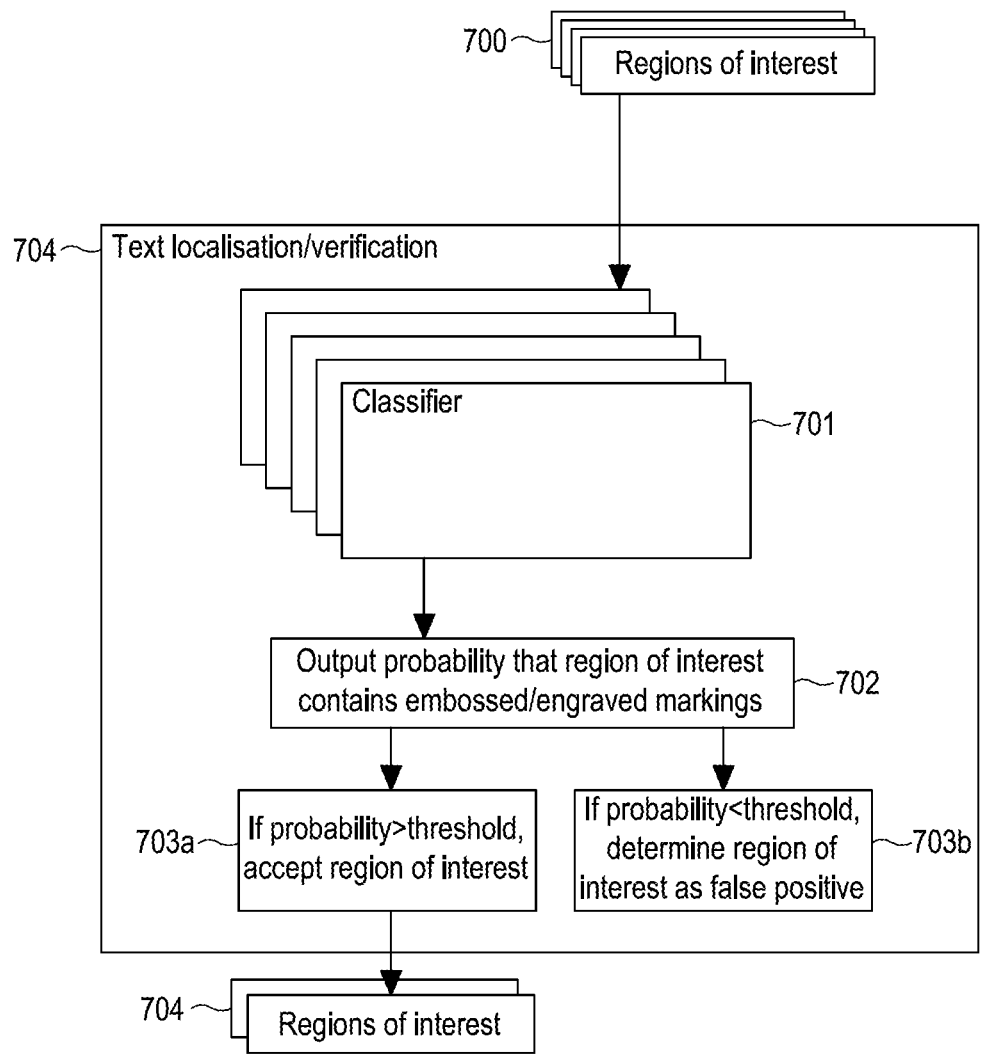
FIG. 7 is a flowchart of a method to verify regions of interest according to an embodiment.

FIG. 7 is a flowchart showing a method 704 according to an embodiment corresponding to step 104b in FIG. 1. The output regions of interest 700 from the proposal generator method 104a are input into a classifier 701. The classifier 701 localises text within the regions of interest and thereby verifies genuine regions of interest as well as false positives. In other words, for each region of interest, it determines which are false positives and which aren't. False positives are discarded whereas genuine regions of interest are selected. The classifier 701 may be a deep neural network which outputs a probability 702 that a given region of interest does actually contain the embossed/engraved markings (such as the above described "D", "0", "T" character sequence). If the probability is below a predetermined threshold, the given region of interest is determined to be a false positive and rejected 703b. Otherwise it is accepted 703a as a genuine region of interest and outputted 704.

An illustrative example of a deep network 801 which may be used as a classifier 701 is shown in FIG. 8(a). It is envisaged that other similar architectures, such as that described in "Jaderberg et al (2016), *Reading Text in the Wild with Convolutional Neural networks, International Journal of Computer Vision* 116(1):1-20 DOI 10.1007/s11263-015-0823-z" may be used.

Indeed, the method with which false positives are rejected is independent of and is not essential to enable the advantages provided by step 104a. To compare the detection probabilities to a predefined threshold, a Softmax layer at the end of the CNN classifier may be used.

The training set for this illustrative network 801 contained multiple DOT and background classes (1.6 million images in 10 classes: 7 DOT classes and 3 background classes for plain background, edges/texture and non-DOT text). In the example shown in FIG. 14(a) an input DOT text image 800 of 32×100 pixels is used i.e. the detection outcome of the HOG-CNN or HOG-MLP is 60×130 pixels which is down-sampled to 32×100 pixels. The classification results 802 are then mapped to a binary output (DOT/non-DOT). Similar to HOG-MLP, when the imaging and lighting setup no longer requires changes during e.g. installation, calibration, and/or hardware product development and data sets are made more consistent, the text localisation network 1001 can be reduced to a 4 way-classifier 803 (DOT, plain background, non-DOT text and edges/textures) as shown in FIG. 8(b). As a result, a lot of false positives generated by the proposal generator can be rejected and only a few strong candidates are retained. False positives seeping through at this stage can be addressed by text recognition in the code reading stage 105 should it be required.

Code Reading 105

Code reading 105 may consist of two stages as is illustrated in FIG. 1: text or character detection/localisation 105a (in which the characters of the code are localised) and text or character recognition 105b (in which the characters are recognised and outputted). Steps 105a and 105b may either be performed by the same classifier in a single step or by separate classifiers. The code patch (i.e. the portion of the image which contains the DOT code and the characters following the 'DOT' anchor position) of the image is first pre-processed to crop it down to the text height using low-level edge filtering. Then, the patch height is resized to 40-50 pixels in accordance with the code detection network's stride (number of pixels skipped between two consecutive detection windows on the input image).

Figure 9:
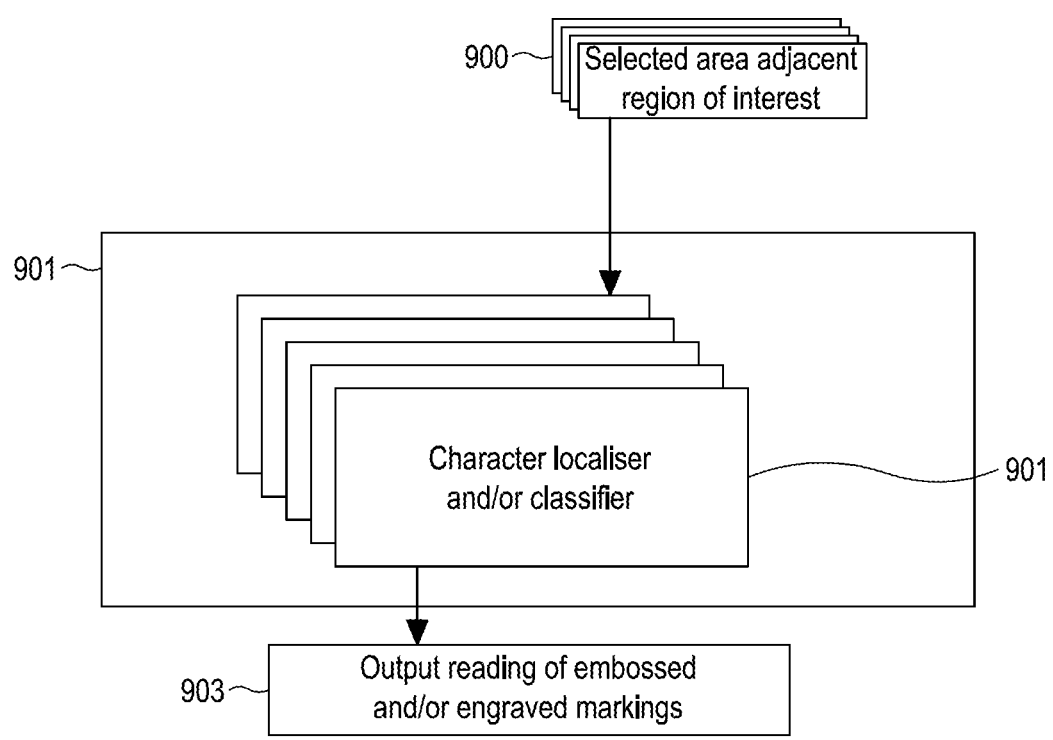
FIG. 9 is a flowchart of a method to localise/verify tyre sidewall code according to an embodiment.

FIG. 9 is a flowchart of a method 901 used to localise and/or classify the tyre sidewall code (i.e. to read the embossed and/or engraved markings of the tyre sidewall) using a single classifier which corresponds to both steps 105a, and 105b from FIG. 1. Areas adjacent to the verified regions of interest are selected and input into the single classifier 901. The classifier 901 may then localise the characters/symbols of the code within the selected area and output a probability 903 that a given character/symbol is recognised as e.g. a character such as a letter or a number, from which an output reading of the embossed and/or engraved markings (i.e. the tyre sidewall code) can be provided.

Figure 10:
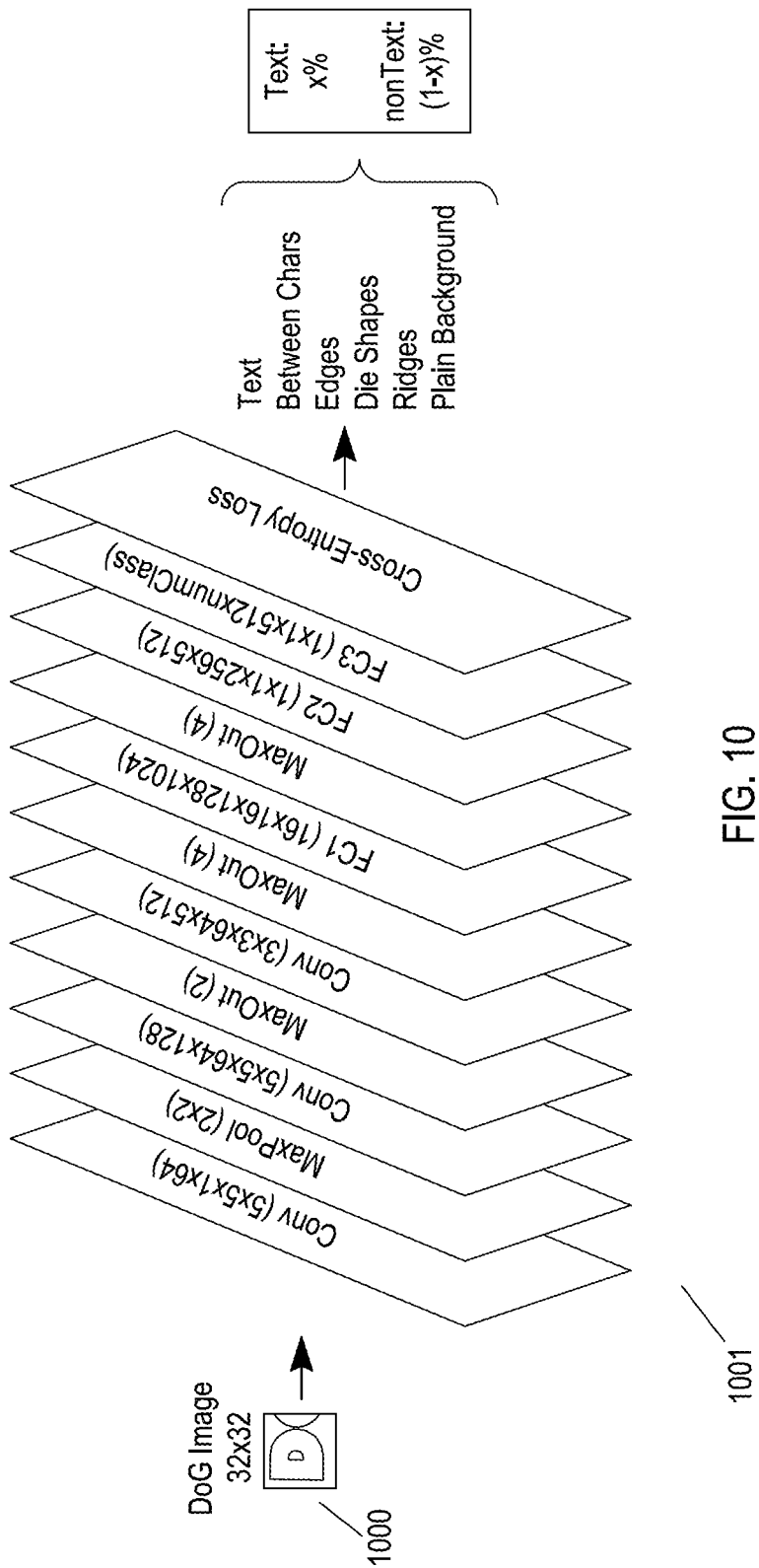
FIG. 10 is a block diagram of network architecture according to an embodiment.
Figure 11:
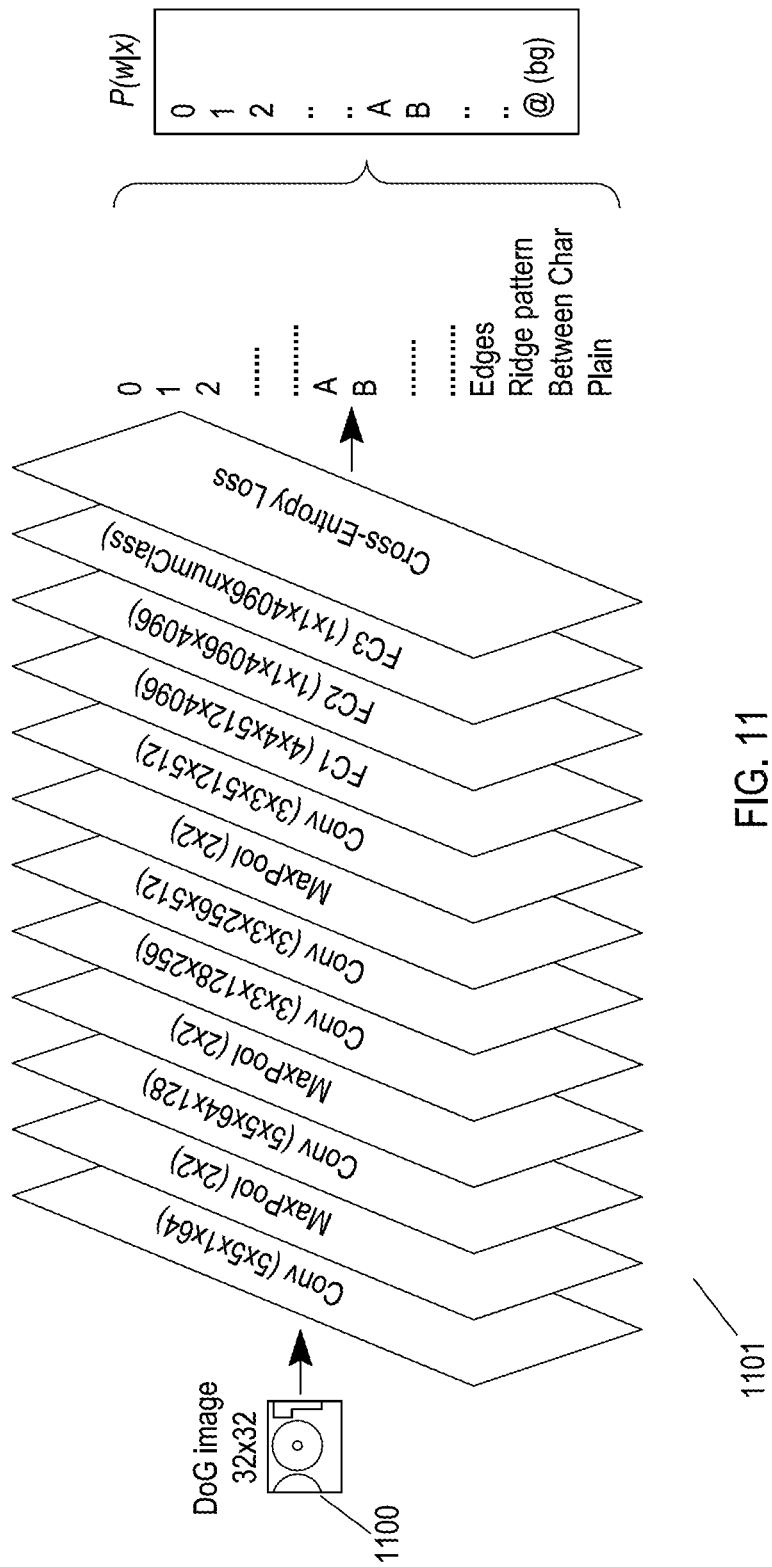
FIG. 11 is a block diagram of network architecture according to an embodiment.

Alternatively, FIGS. 10 and 11 illustrate separate networks which may perform the steps 105a and 105b separately. It will be appreciated that numerous OCR techniques exist and it is envisaged that any such techniques may be used once the proposals/regions of interest have been generated as described in step 104a.

With reference to FIG. 10, since the text has very low contrast with respect to the background, a dense prediction mechanism is required such as that provided by the architecture 1001 shown in FIG. 10. In CNNs, max pooling layers down-sample the image which increases the network stride. Removing max pooling layers will allow dense (pixel by pixel) predictions but will enormously increase the parameters space which will have its toll both on the efficiency and accuracy. Regularization techniques such as DropOuts in combination with MaxOut activations are helpful in improving the accuracy. Therefore, as shown in FIG. 10, MaxOuts were used in this architecture. The inventors observed that if a ReLU precedes MaxOut layers, the network converges quickly to a minimum during training. The input 1000 of FIG. 10 is illustrated as a DoG image having 32×32 pixel size. Other network architectures are also envisaged, such as, for example, those described in "Goodfellow et al (2013), *Maxout Networks, Proceedings of the* 30*th International Conference on Machine Learning*—Volume 28, JMLR.org, ICML'13, pp III-1319-111-1327" and "Jaderberg et al (2014), *Deep Features for Text Spotting, European Conference on Computer Vision*". Finally, in the same way as in the HOG-CNN and HOG-MLP, fully connected (FC) layers composed of convolutional layers allow the network to slide over the entire code patch, detecting and localizing text on the way and avoiding any need for a spatial sliding window mechanism.

In the present example, training was done on a 700K image dataset with text class synthetically generated as described above. The background class was extracted from actual tyre patches. It contained single edges, ridge patterns, cast or die shapes and a plain background. The output was mapped to a binary class probability i.e. text/non-text. The character detector produced bounding boxes by convolutionally scanning the entire code patch as discussed earlier. The boxes thus detected are centred on the regions with the highest probabilities of text being present. Non-maxima suppression was applied to the detected boxes to filter down the proposals. A character classifier may optionally be used for character detection as well. However, the inventors have found that a dedicated classifier for code character detection which is separate to a character classifier for code text recognition performs better.

As described above, a separate character recognition network 1101 as shown in FIG. 11 is used in this illustrative example to perform step 105b. After localisation has been performed in step 105a using, for example, the architecture shown in FIG. 10, the detected code character locations are used to extract characters which are fed into a character classifier network 1101. Other character classifiers may also be used, such as that described by "Jaderberg et al (2016), *Reading Text in the Wild with Convolutional Neural networks, International Journal of Computer Vision* 116(1):1-20 DOI 10.1007/s11263-015-0823-z". This network has classes for numerals 0 to 9, capital alphabets A to Z (excluding I, Q, S and O which are not used in the tyre DOT codes) and seven background classes, making a 39-way classifier which is mapped to 33 classes (32 character and 1 background class). The model was trained on the inventors' synthetic character dataset of around 700,000 images. A classifier may also be trained to recognise particular brands, logos or symbols found in the tyre sidewall code, should this be required.

Advantages

As the proposed system is an industrial system, both accuracy and efficiency are equally important. In particular, the proposal/region of interest generator described above in step 104a provides a significant increase in efficiency of a tyre sidewall reading system without suffering a noticeable drop in accuracy. The inventors envisage that the proposal/region of interest generator may thus be used with any known computer vision and OCR techniques applied to tyre sidewall reading whose methods require the generation of proposals/regions of interest.

Accuracy

Whilst accuracy is ultimately dependent on the data sample being analysed. The training error of the architectures described herein was under 5%. Overfitting by the networks may be even further reduced if synthetic training data is mixed with real image data and/or training time data augmentation such as affine deformations are added. HOG-CNN and HOG-MLP thus provide a less than 5% false positive rate for region of interest generation on tyre sidewall text. This is despite wide variations in tyre height, radius and position relative to a wheel arch.

Efficiency

For an industrial system, with an end user waiting for results, efficiency is crucial. GPUs (Graphical Processing Units) have extensively been used in deep learning-based systems, but deploying GPUs means scaling up the total system cost, as they are deployed at each imaging site. With an increasing demand and every site requiring two units (one each for the right and the left hand side of the vehicle), keeping the total cost low becomes a key attribute. Thus, as described above, a CPU-based system is ideally sought.

Scanning the entire unwarped image (average size 500× 3000 pixels) with a deep network, takes more than 20 secs on a Core i7 3.6 GHz CPU (requiring parameter memory of 496 MB). Indeed, when some of the top performing algorithms for object/text detection (i.e. those which have a high ranking on benchmark data sets) are applied to imaging tyre sidewall text, they quickly become a computational bottleneck.

In contrast, the proposed shallow network (either HOG-CNN or HOG-MLP) requires a parameter memory of only 1 to 3 MB. When it is then followed by a deep scan of only the proposals thus generated, the total scan time is reduced to around 3 sec. This is an improvement by an order of magnitude in terms of efficiency (almost 95% speedup), as well as a significant reduction in the total system cost and complexity (due to it having CPU based operations only), without any apparent compromise on the accuracy as the recall of HOG-CNN or HOG-MLP is nearly 100%. With this, the end-to-end results for processing an image for tyre detection and unwarping and then scanning a resultant 500×3000 pixel unwarped image at three different scales followed by detecting and reading the code takes on average 3 to 5 secs on the above mentioned CPU.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

For example, whilst FIG. 6(a) envisages two fully connected convolutional layers 607a, 607b, this may be reduced to one layer to further reduce computational overhead at the cost of accuracy. In other words, the convolutional neural network may comprise one or two fully connected convolutional layers. Alternatively, to increase accuracy, the number of fully connected layers may be increased to three or more layers at the cost of computational complexity. However, it is envisaged that using more than two layers may increase computational complexity to such an extent that compute time is increased to unacceptable levels for a fleet operator and/or require GPUs, thereby reducing or entirely eliminating any advantage gained by using HOG-CNN or HOG-MLP. Whilst this may not be problematic for ideal, laboratory settings, it is for an industrial system where cost and efficiency are priorities and thus where shallow networks provide far greater advantages.

The invention claimed is:

1. A computer implemented method for generating a region of interest on a digital image of a sidewall of a tyre, the sidewall having one or more embossed and/or engraved markings, the method comprising:

generating a histogram of oriented gradients feature map of the digital image;

inputting the histogram of oriented gradients feature map into a trained neural network, wherein the trained neural network is configured to output a first probability based on the input histogram of oriented gradients feature map that a region of pixels of the digital image contains the embossed and/or engraved markings; and if the first probability is at or above a first predetermined threshold, accepting the region of pixels as the region of interest.

2. The computer implemented method of claim 1, wherein generating a histogram of oriented gradients feature map is performed by a stack of convolutional filters in a trained convolutional neural network.

3. The computer implemented method of claim 1, wherein generating a histogram of oriented gradients feature map is performed by a histogram of oriented gradients generator separated from the trained neural network.

4. The computer implemented method of claim 1, wherein the trained neural network comprises one or two fully connected layers.

5. The computer implemented method of claim 1, wherein the trained neural network is trained with training data comprising a plurality of histograms of oriented gradients feature maps generated from a plurality of digital images of tyre sidewalls.

6. The computer implemented method of claim 5, wherein the training data further comprises synthetic data.

7. The computer implemented method of claim 1, further comprising:

if the first probability is below the first predetermined threshold, rejecting the region of pixels as the region of interest.

8. The computer implemented method of claim 1, further comprising:
- applying a classifier to the region of interest;
- wherein the classifier is configured to output a second probability that the region of interest contains the embossed and/or engraved markings; and
- if the second probability is below a second predetermined threshold, determining that the region of interest is a false positive.

9. A method of reading embossed and/or engraved markings on a sidewall of a tyre, the method comprising:
- providing a digital image of the sidewall of the tyre;
- unwarping the digital image;
- generating a region of interest on the digital image;
- applying a classifier to determine if the region of interest is a false positive, and if the region of interest is a false positive, discarding the region of interest, or if the region of interest is not a false positive, selecting the region of interest;
- selecting an area of the digital image adjacent to the selected region of interest; and
- applying a classifier to the area of the digital image adjacent to the selected region of interest to read the embossed and/or engraved markings,
- wherein generating a region of interest on the digital image comprises:
  - generating a histogram of oriented gradients feature map of the digital image;
  - inputting the histogram of oriented gradients feature map into a trained neural network, wherein the trained neural network is configured to output a probability based on the input histogram of oriented gradients feature map that a region of pixels of the digital image contains the embossed and/or engraved markings; and
  - if the probability is at or above a predetermined threshold, accepting the region of pixels as the region of interest.

10. The method of claim 9, wherein generating a histogram of oriented gradients feature map is performed by a stack of convolutional filters in a trained convolutional neural network.

11. The method of claim 9, wherein generating a histogram of oriented gradients feature map is performed by a histogram of oriented gradients generator separated from the trained neural network.

12. A non-transitory computer-readable storage medium storing a computer program comprising instructions which, when executed by a computer, cause the computer to perform operations including:
- generating a histogram of oriented gradients feature map of the digital image, wherein the sidewall has one or more embossed and/or engraved markings;
- inputting the histogram of oriented gradients feature map into a trained neural network, wherein the trained neural network is configured to output a first probability based on the input histogram of oriented gradients feature map that a region of pixels of the digital image contains the embossed and/or engraved markings; and
- if the first probability is at or above a first predetermined threshold, accepting the region of pixels as the region of interest.

* * * * *